United States Patent
Kraft et al.

(10) Patent No.: US 11,136,167 B2
(45) Date of Patent: Oct. 5, 2021

(54) PLASTIC CONTAINER WITH THREADED NECK FINISH

(71) Applicant: Plastipak Packaging, Inc., Plymouth, MI (US)

(72) Inventors: Philip Kraft, Frankfort, IL (US); Matt Dauzvardis, Manhanttan, IL (US)

(73) Assignee: Plastipak Packaging, Inc., Plymouth, MI (US)

( * ) Notice: Subject to any disclaimer, the term of this patent is extended or adjusted under 35 U.S.C. 154(b) by 6 days.

(21) Appl. No.: 16/129,938

(22) Filed: Sep. 13, 2018

(65) Prior Publication Data

US 2019/0009952 A1 Jan. 10, 2019

Related U.S. Application Data

(63) Continuation-in-part of application No. 14/751,463, filed on Jun. 26, 2015, now Pat. No. 10,759,559.

(Continued)

(51) Int. Cl.
*B65D 41/04* (2006.01)
*B65D 1/16* (2006.01)
(Continued)

(52) U.S. Cl.
CPC .......... *B65D 41/0471* (2013.01); *B65D 1/10* (2013.01); *B65D 1/165* (2013.01); *B65D 1/44* (2013.01);
(Continued)

(58) Field of Classification Search
CPC B65D 1/0246; B65D 41/0471; B65D 1/0261; B29L 2031/7158; B29K 2067/003; B29K 2023/06; B29K 2023/12
(Continued)

(56) References Cited

U.S. PATENT DOCUMENTS

| 1,849,522 A | 3/1932 | Hammer |
| 1,849,523 A | 3/1932 | Hammer |

(Continued)

FOREIGN PATENT DOCUMENTS

FR 2864519 B1 12/2006

OTHER PUBLICATIONS

English Summary of first Chinese Office Action, 201580043810.8, dated Nov. 29, 2017.
(Continued)

*Primary Examiner* — Ernesto A Grano
(74) *Attorney, Agent, or Firm* — Fishman Stewart PLLC

(57) ABSTRACT

A plastic intermediate article including a container portion and a trim portion. The container portion includes a neck portion having a plurality of threads. In embodiments, each of the plurality of threads include a first portion and a second portion, wherein the first portion is provided at a first angle relative to a centerline of the plastic blow molded intermediate article, the second portion is provided at a second angle relative to the centerline of the plastic blow molded intermediate article, and the first angle and second angle are different. A method for making a plastic container includes providing a plastic preform, blow molding the preform into an intermediate article that includes a neck portion with a plurality of blown threads, and removing an upper portion of the intermediate article.

14 Claims, 20 Drawing Sheets

Related U.S. Application Data

(60) Provisional application No. 62/557,916, filed on Sep. 13, 2017, provisional application No. 62/017,658, filed on Jun. 26, 2014.

(51) Int. Cl.
| | | |
|---|---|---|
| *B65D 43/02* | (2006.01) | |
| *B65D 1/10* | (2006.01) | |
| *B65D 1/44* | (2006.01) | |
| *B65D 51/20* | (2006.01) | |

(52) U.S. Cl.
CPC ......... *B65D 43/0231* (2013.01); *B65D 51/20* (2013.01); *B29B 2911/1444* (2013.01); *B29B 2911/14328* (2015.05); *B29B 2911/14335* (2015.05); *B29B 2911/14666* (2013.01); *B65D 2251/0018* (2013.01); *B65D 2251/0093* (2013.01); *B65D 2543/00092* (2013.01); *B65D 2543/00296* (2013.01); *B65D 2543/00527* (2013.01); *B65D 2543/00537* (2013.01)

(58) Field of Classification Search
USPC ........................................................ 215/12.1
See application file for complete search history.

(56) References Cited

U.S. PATENT DOCUMENTS

| | | | |
|---|---|---|---|
| 1,988,383 A | 1/1935 | Hermani | |
| 2,013,669 A | 9/1935 | Peters | |
| 3,774,795 A | 11/1973 | Leenaards | |
| 4,006,837 A | 2/1977 | Gates et al. | |
| 4,662,530 A | 5/1987 | Goncalves et al. | |
| 5,678,711 A | 10/1997 | Tobias | |
| 5,944,207 A | 8/1999 | Reidenbach | |
| 5,967,352 A | 10/1999 | Repp et al. | |
| 6,062,408 A | 5/2000 | Beck et al. | |
| D428,815 S | 8/2000 | Mooney et al. | |
| 6,124,008 A | 9/2000 | Barre | |
| D442,886 S | 5/2001 | Carrell, Jr. | |
| 6,228,317 B1 * | 5/2001 | Smith .................. | B65D 1/0223 264/521 |
| 6,495,226 B1 | 12/2002 | Slat | |
| 6,568,156 B2 * | 5/2003 | Silvers ................... | B65B 3/022 53/140 |
| 6,648,157 B2 | 11/2003 | Shai et al. | |
| 6,740,284 B2 | 5/2004 | Darr et al. | |
| 6,763,968 B1 | 7/2004 | Boyd et al. | |
| 6,814,923 B2 * | 11/2004 | Bromley ............. | B29C 49/0073 264/536 |
| 6,857,531 B2 | 2/2005 | Slat et al. | |
| 6,933,055 B2 | 8/2005 | Share et al. | |
| 6,997,336 B2 | 2/2006 | Yourist et al. | |
| 7,083,059 B1 | 8/2006 | Le Guen | |
| 7,182,213 B2 | 2/2007 | King | |
| 7,207,451 B2 | 4/2007 | Taylor et al. | |
| 7,226,560 B2 * | 6/2007 | Dunlap .................... | B26D 3/10 264/536 |
| 7,691,290 B2 | 4/2010 | Deshpande et al. | |
| 7,732,035 B2 | 6/2010 | Pedmo et al. | |
| 7,770,745 B2 * | 8/2010 | Weissmann ............ | B65D 23/00 215/390 |
| 7,861,874 B2 | 1/2011 | Cook et al. | |
| 7,866,496 B2 | 1/2011 | Kraft | |
| 8,292,102 B2 | 10/2012 | Penny et al. | |
| 8,596,029 B2 | 12/2013 | Pedmo et al. | |
| 8,672,159 B2 | 3/2014 | Moreira | |
| 8,870,006 B2 | 10/2014 | Kamineni et al. | |
| 9,150,320 B2 | 10/2015 | Wurster et al. | |
| 9,205,958 B2 | 12/2015 | Cook | |
| 2002/0020149 A1 | 2/2002 | Silvers et al. | |
| 2003/0124374 A1 | 7/2003 | Bromley et al. | |
| 2004/0000127 A1 | 1/2004 | Joshi et al. | |
| 2005/0163882 A1 | 7/2005 | Dunlap et al. | |
| 2006/0011633 A1 | 1/2006 | Cook et al. | |
| 2007/0012650 A1 | 1/2007 | Eble | |
| 2007/0045216 A1 | 3/2007 | Gami et al. | |
| 2007/0289933 A1 | 12/2007 | Weissmann et al. | |
| 2009/0008360 A1 | 1/2009 | Piccioli et al. | |
| 2011/0024382 A1 | 2/2011 | Moreira | |
| 2011/0100988 A1 | 5/2011 | Fraser et al. | |
| 2011/0171405 A1 | 7/2011 | Deshpande | |
| 2011/0172335 A1 | 7/2011 | Deshpande | |
| 2011/0220668 A1 | 9/2011 | Steih et al. | |
| 2012/0000879 A1 | 1/2012 | McFarlane et al. | |
| 2012/0061410 A1 | 3/2012 | Kamineni et al. | |
| 2012/0255927 A1 | 10/2012 | Cook | |
| 2013/0206718 A1 | 8/2013 | Toribio et al. | |
| 2015/0274378 A1 | 10/2015 | Galownia et al. | |

OTHER PUBLICATIONS

ISA/USPTO; International Search Report and Written Opinion issued in corresponding international application No. PCT/US2015/037912; dated Sep. 24, 2015.

* cited by examiner

PLASTIC CONTAINER WITH THREADED NECK FINISH

CROSS-REFERENCE TO RELATED APPLICATION

This application is a continuation-in-part of U.S. patent application Ser. No. 14/751,463, filed Jun. 26, 2015, which claims the benefit of U.S. Provisional Application Ser. No. 62/017,658, filed Jun. 26, 2014, and this application also claims the benefit of priority to U.S. Provisional Application Ser. No. 62/557,916, filed Sep. 13, 2017, all the foregoing being fully incorporated herein by reference.

TECHNICAL FIELD

The present invention relates to plastic containers, including plastic containers having a threaded neck finish.

BACKGROUND

Plastic containers with threaded neck finishes are known in the art. The technology has advanced to where a neck finish may include threading that is injection molded or blow molded. Moreover, plastic neck finishes may be used for various container applications, including "wide-mouth" and/or hot-fill container applications, as well as those that require the neck finish to hold its shape over an extended period of time and to maintain structural and seal integrity with respect to a closure.

Among other things, it can be desirable to provide a plastic container with a threaded neck finish that can replace glass jars, including "wide-mouth" round jars; accommodate reclosable caps or lids, including metal caps or lids commonly used with glass jars; and/or run on equipment commonly used in connection with glass jar production and handling.

SUMMARY

A plastic container includes a neck portion, a sidewall portion, and a base portion. The neck portion includes a plurality of threads, which may be configured to retain and/or secure a cap or lid. In embodiments, the threads may be blown, and/or the neck portion may include a neck rib provided vertically above the threads. Methods for forming a container are also disclosed.

BRIEF DESCRIPTION OF THE DRAWINGS

Embodiments of the disclosure will now be described, by way of example, with reference to the accompanying drawings, wherein.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined herein and by appended claims.

Figure 1:
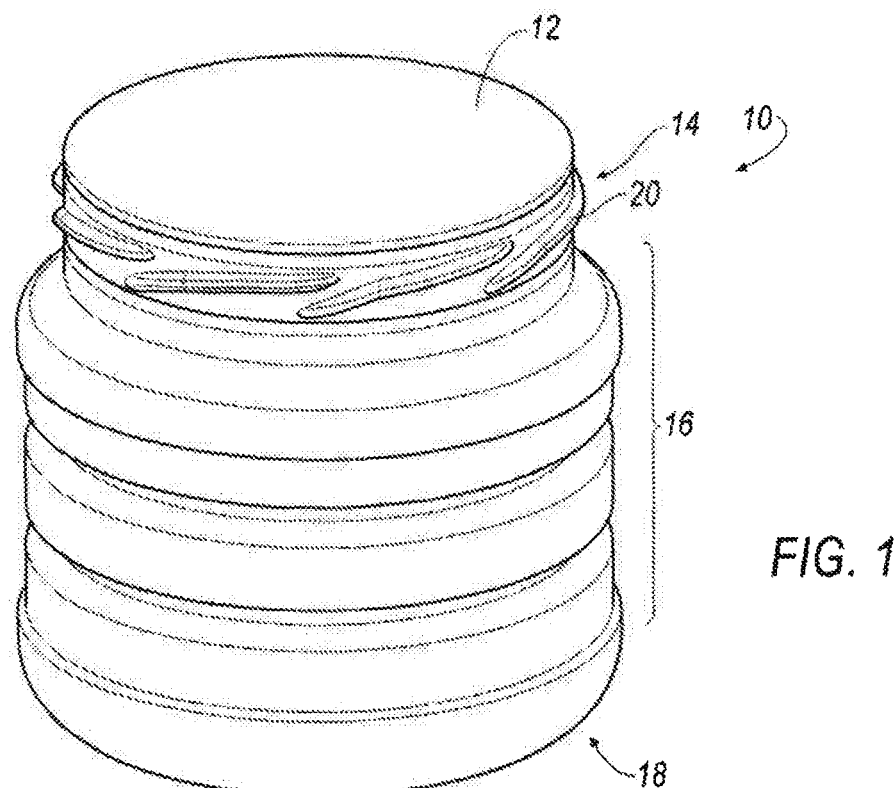
FIG. 1 is a perspective view of a three-dimensional model of an embodiment of a container that incorporates features of the present teachings.

With reference to FIG. 1, a three-dimensional model of an embodiment of a container 10 is generally illustrated. The container 10 includes an opening 12, which if desired can be further covered with an optional seal. The opening 12 can serve to fill and/or dispense container contents. The container 10 includes a neck portion 14, a sidewall portion 16, and a base portion 18.

Embodiments of a container may be formed from various polymers known in the field of container manufacture including, for example and without limitation, polyethylene terephthalate (PET), polyethylene (PE), polypropylene (PP), and combinations and blends of two or more polymers. For embodiments, the container may, for example and without limitation, be produced by an injection stretch blow molding (ISBM) blow-trim process. In an embodiment, an injection molded preform may be stretch blow molded into an intermediate article that includes the general form/configuration of a container with blown threads, such as disclosed herein. An example of such an intermediate article and related process may be generally found in U.S. Patent Publication No. 2005/0163882 and U.S. Pat. No. 6,740,284, which are each incorporated herein by reference in their entirety. Thereafter, a portion of the intermediate article provided above the neck portion (including the blown threads), e.g., a moil or a dome, may be trimmed off or otherwise separated to leave a container as shown and described in this disclosure. The container may, if desired, be heat-treated using various processes, including those that can improve the ability of a container to be hot-filled.

Figure 2:
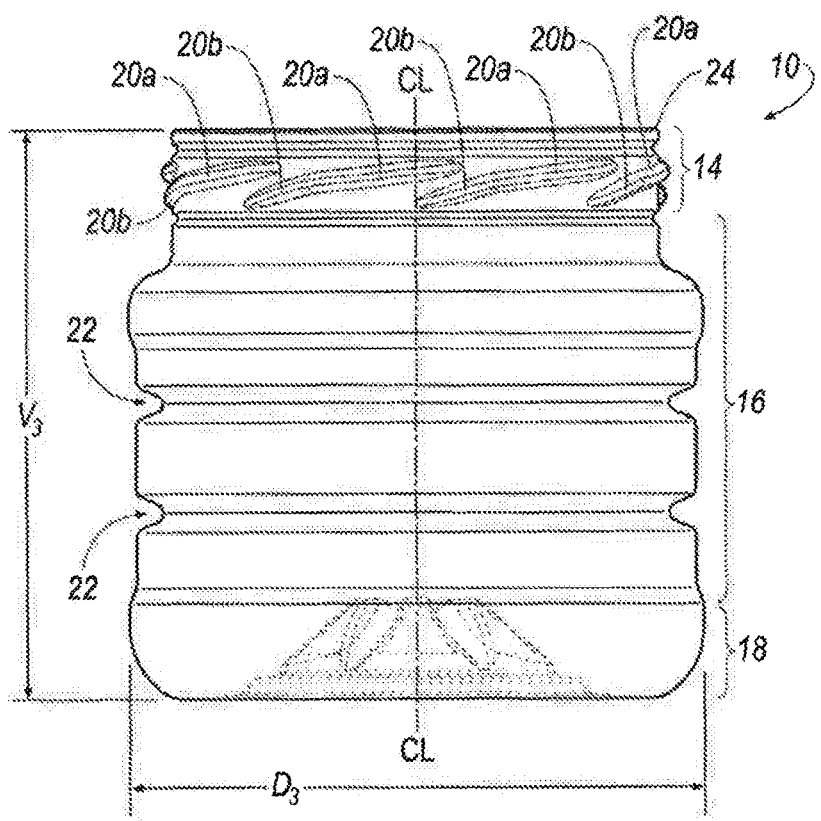
FIG. 2 is a side elevational view of an embodiment of a container incorporating features of the present teachings.

FIG. 2 generally illustrates a side elevational view of a container 10 embodying teachings of the present disclosure. The neck portion 14 is shown including a plurality of threads 20, which may also be referred to as "threading formations" or "lugs." In embodiments, the neck portion, and the threads, may be injection molded or, alternatively, may be blown or blow molded.

As generally illustrated, threads 20 may be provided around, and extend radially outwardly from, an outer surface of the neck portion 14. The illustrated container 10 includes eight threads 20. However, embodiments of the container may include more or less than eight threads. Moreover, successive threads 20—following around the circumference of the neck portion 14—may have portions that vertically overlap, but are vertically spaced, from each other. Each thread 20 may be generally provided at a single angle relative to a vertical centerline CL or, as shown in the illustrated embodiment, may include more than one portion—such as first portion 20a and a second portion 20b.

Embodiments having a neck portion 14 such as generally illustrated and described herein may, for example, be used in connection with various wide-mouth plastic containers, including those replacing glass jars and related applications. Such wide-mouth plastic containers may have openings that range, for example and without limitation, from 63 mm to 82 mm, and for some applications could be 83 mm or more.

Figure 3:
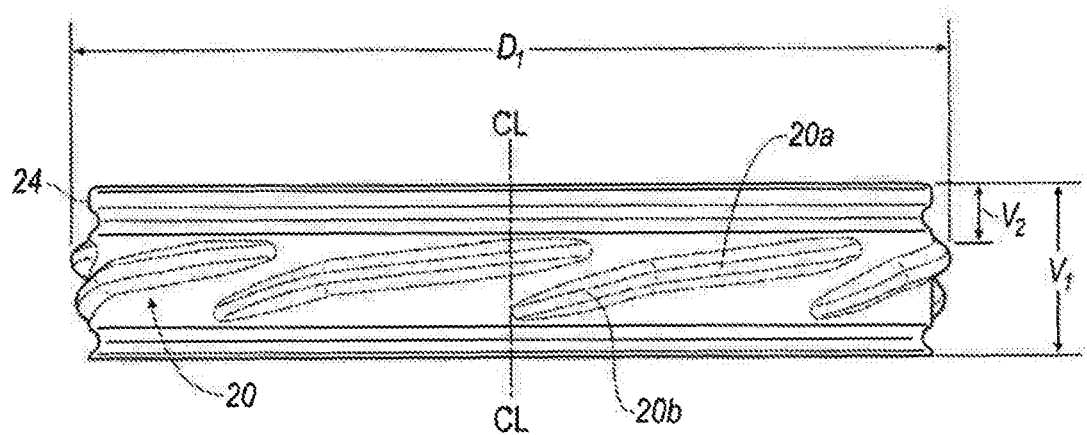
FIG. 3 is a partial side view of a neck finish portion of an embodiment of a container incorporating features of the present teachings.

With reference to FIG. 3, the neck portion 14 may include a neck rib 24 provided above the threads 20. The inclusion of one or more neck ribs 24 provided above the threads 20 can, among other things, help maintain container hoop strength and/or prevent or reduce ovality associated with the neck portion 14. A neck rib 24 can be helpful for running plastic containers on lines, such as existing glass jar lines, including those that employ a belt system for in-line capping. For some systems, one device (e.g., set of belts) can be configured to turn the jar or container in a first direction, while another device may turn a cap in an opposite rotational direction to engage and seal a container.

The neck portion 14 may further include a first portion 20a and a second portion 20b of a thread 20 may be generally provided at different angles relative to the center line CL of the container 10. As generally illustrated, the angle (relative to the center line CL) of the first portion 20a may be greater (and even visually perceptibly greater) than the angle of the second portion 20b. That is, and with respect to a different perspective, if a plane of a support surface upon which the container may rest is viewed as being flat at 0 degrees, the angle associated with the first portion 20a (relative to the support surface) may be lesser/less steep (and even visually/perceptively less step) than the angle associated with the second portion 20b. With embodiments, portions of successive threads may vertically overlap and may be vertically spaced from each other. For embodiments each successive thread may include a portion that is overlapped by, and also a portion that overlaps another successive thread (see, for example and without limitation, the neck portions of FIGS. 2 and 3). Additionally, for embodiments, a portion of the second portion 20b may extend in a vertical direction (and at a continued angle) below a secured cap or lid, and such portion may be at least partially visible when the cap or lid is secured to the container.

With embodiments, the vertical distance V1 of the neck portion 14 may be significantly less than the outer diameter D1 of the neck portion 14. In an embodiment of the container, the neck finish of the container may comprise, for example, an 82 mm or an 83 mm blown finish. For example, and without limitation, with embodiments the diameter D1 of the neck portion 14 may be about five times (or even more for some embodiments) greater than the vertical distance V1 of the neck portion 14. Additionally, the uppermost portion of the threads 20 may be offset from the top or uppermost portion of the container 10 by a vertical distance V2. For some embodiments, the offset distance, illustrated in the embodiment as vertical distance V2, may be about one-third of vertical distance V1. For example, and without limitation, V2 for an 82 mm or 83 mm blown finish container may be about 0.206 in. (5.24 mm), while V1 may be about 0.630 in. (16.002 mm).

Further, for some embodiments, the total height, or vertical distance V3 of the container 10, may be substantially the same as the greatest diameter D3 of the container 10. For other embodiments, the difference between vertical distance V3 and the greatest diameter D3 may be within about one percent (1%) of each other. For other embodiments, the difference between vertical distance V3 and the greatest diameter D3 may be within about five percent (5%) of each other.

As generally illustrated in FIG. 2, embodiments of the sidewall portion 16 of a container 10 may include one or more horizontal straps 22, grooves, and/or other formations. Such straps 22, grooves, or other formations may provide additional structure and/or support to the sidewall portion 16. With embodiments, the sidewall portion 16 may be configured to help maintain hoop strength. For example, and without limitation, some embodiments, such as those disclosed in U.S. Pat. No. 6,857,531 and U.S. Patent Application Publication 2012/0061410, which are incorporated herein in their entirety by reference, may include various ribs or formations. The sidewall portion is generally illustrated as being circular in nature; although, other shapes and/or formations may be associated with or included in the sidewall portion 14.

For some embodiments, the container may include one or more barrier materials. For example, an oxygen scavenging barrier material (such as commercially available under the trade name DiamondClear) may be employed. Such materials can, among other things, help to keep oxygen away from container contents. Some examples of such materials are, without limitation, generally disclosed in U.S. Pat. No. 7,691,290; U.S. Patent Application Publication 2011/0172335; U.S. Patent Application 2011/0171405, which are each incorporated herein in their entirety by reference.

Figure 4:
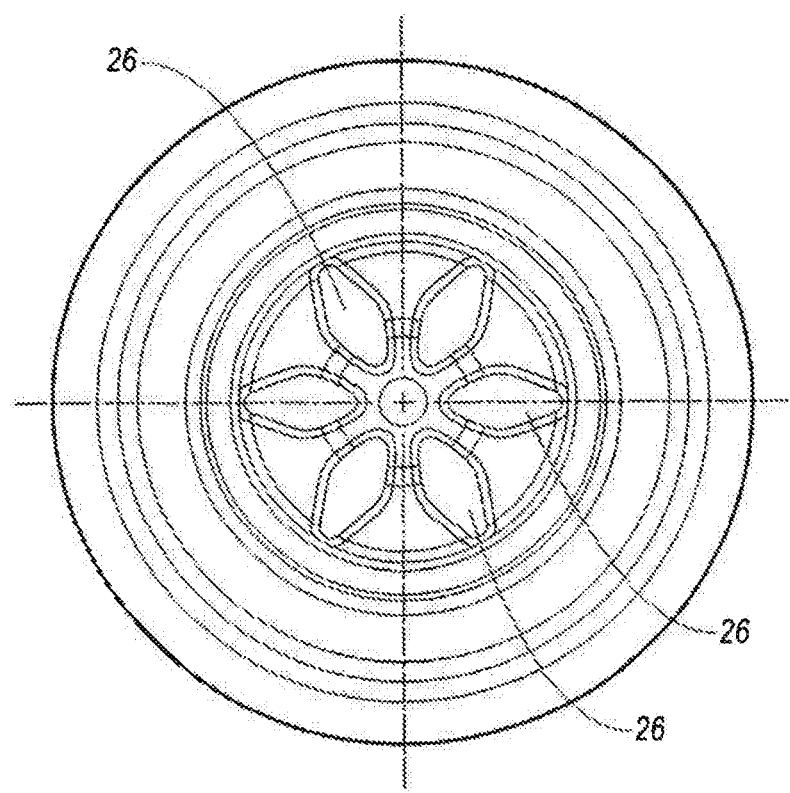
FIG. 4 is a bottom plan view of an embodiment of container incorporating features of the present teachings.

With reference to FIG. 4, the base portion 18 may include formations, such as a plurality of ribs 26 arranged radially about the center line CL of the container. The formations can strengthen/reinforce the base portion 18 so that the container can handle pressures and/or temperatures for given applications, such as hot-fill applications, without retort or unacceptable ovalization. Without limitation, an example of a base portion that includes structural formations to increase the rigidity of a base portion is disclosed in U.S. Pat. No. 7,732,035, which is incorporated in its entirety herein by reference.

Figure 5:
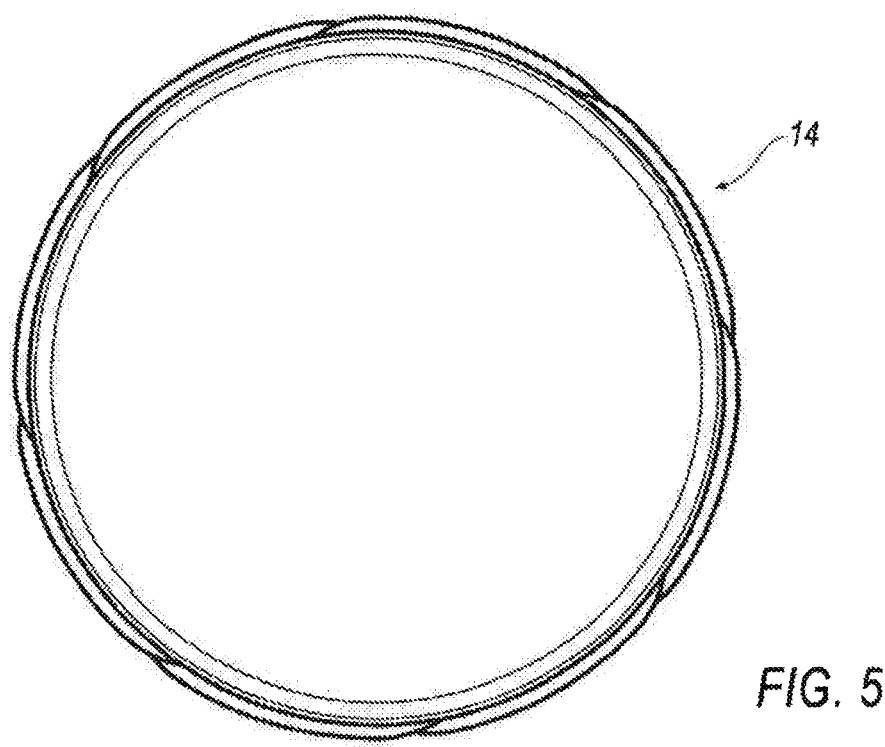
FIG. 5 is a top plan view of a neck portion of an embodiment of a container incorporating features of the present teachings.
Figure 6A:
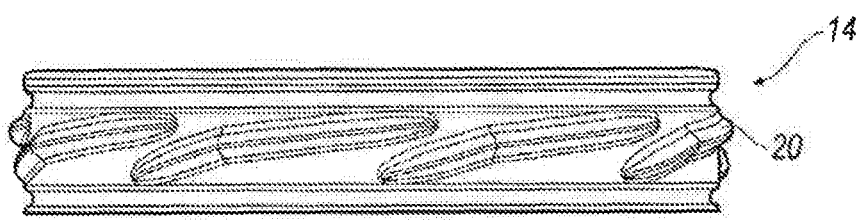
FIGS. 6A and 6B are front and right side views, respectively, of the neck portion shown in FIG. 5.
Figure 6B:
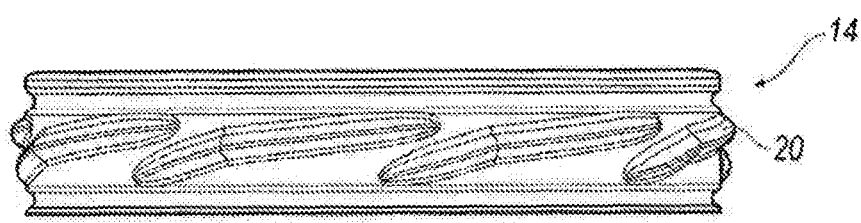

FIG. 5 illustrates a top view of an embodiment of a neck portion 14 embodying features of the present teaching. FIGS. 6A and 6B generally depict an embodiment of a neck portion with a plurality of threads 20 shown from a front and right side, respectively.

Figure 7:
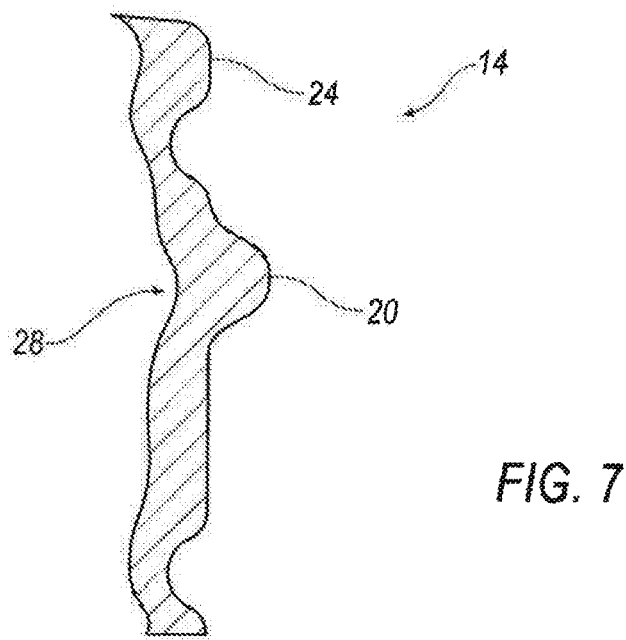
FIG. 7 is a side cross-sectional view of a neck portion such as generally shown in FIG. 5.
Figure 8:
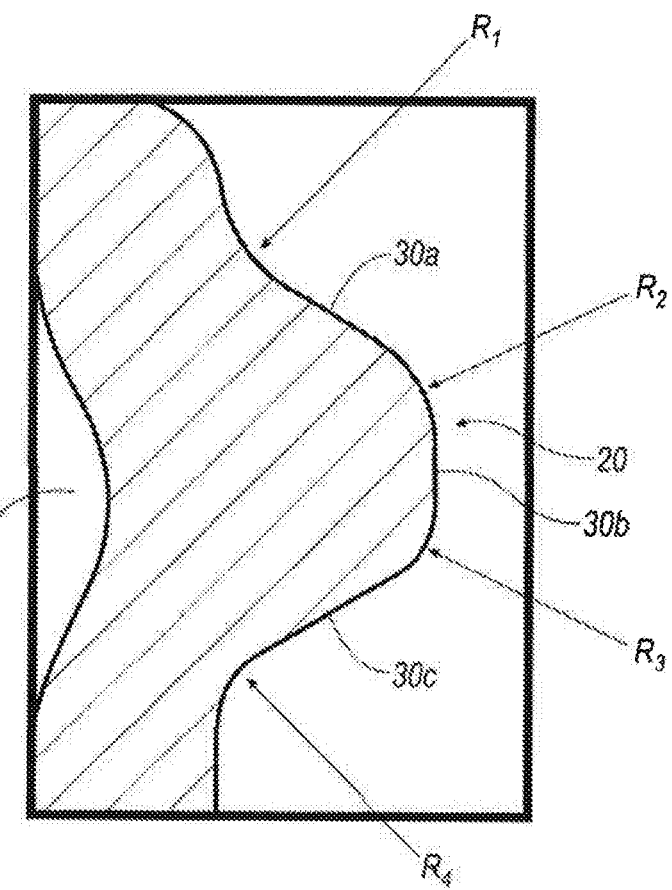
FIG. 8 is an enlarged cross-section view of a portion of the neck portion generally illustrated in FIG. 7.
Figure 9:
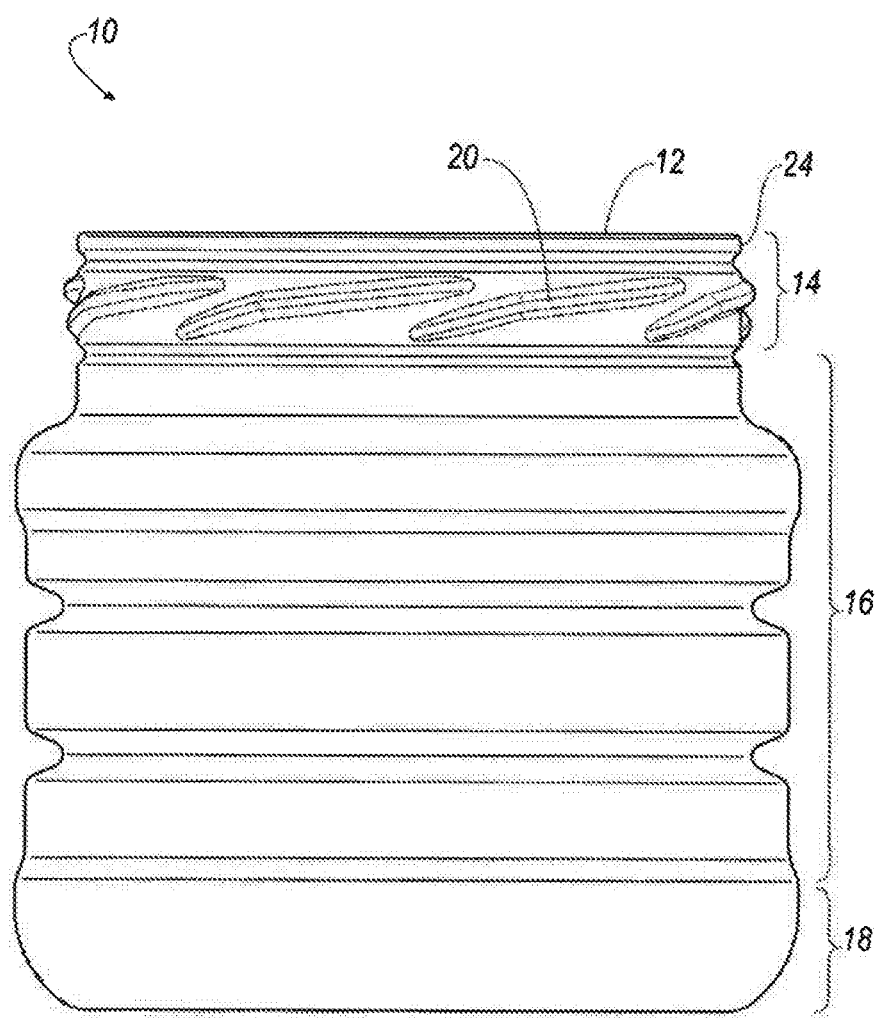
FIG. 9 is a front elevational view of an embodiment of a container incorporating features of the present teachings; the left, right, and back view being substantially similar in the instant embodiment.
Figure 10:
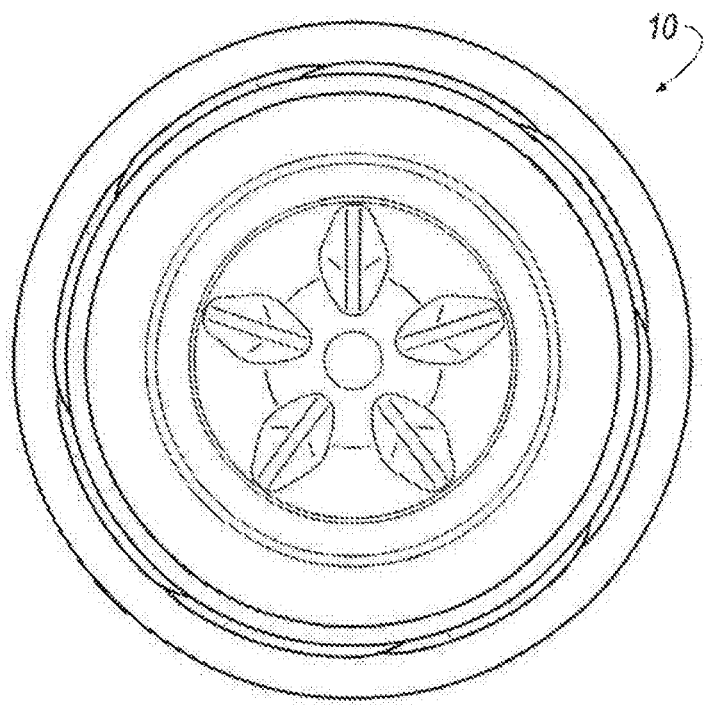
FIG. 10 is a top plan view of the embodiment of a container shown in FIG. 9, including portions of the base visible through the container opening.
Figure 11:
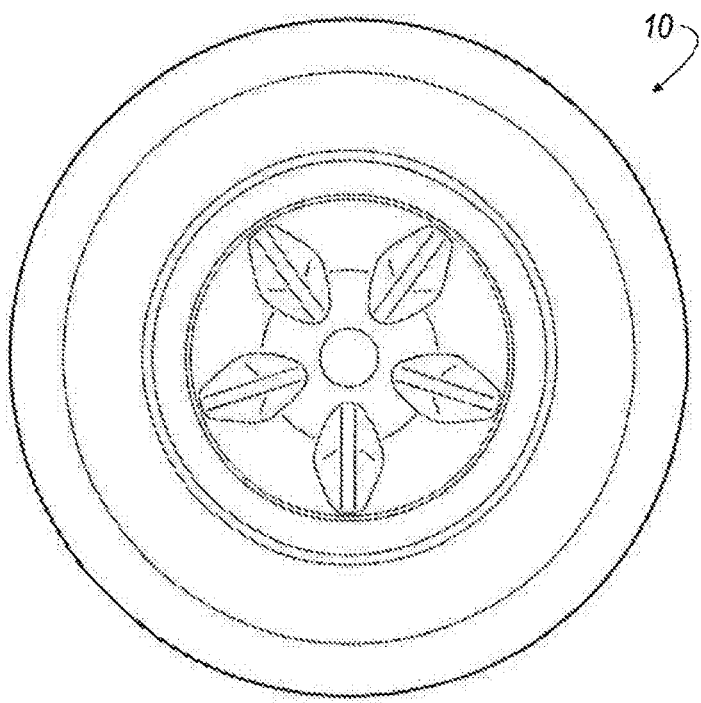
FIG. 11 is a bottom plan view of the embodiment of a container shown in FIG. 9.
Figure 12:
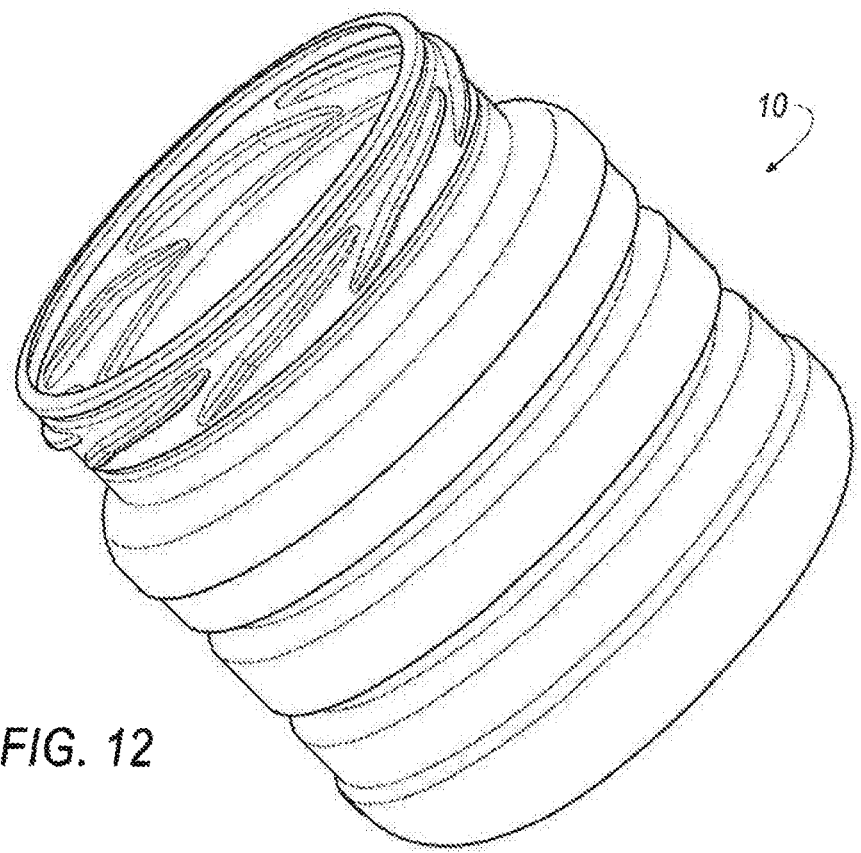
FIGS. 12, 13, and 14 are various different perspective views of the embodiment of a container shown in FIG. 9.
Figure 13:
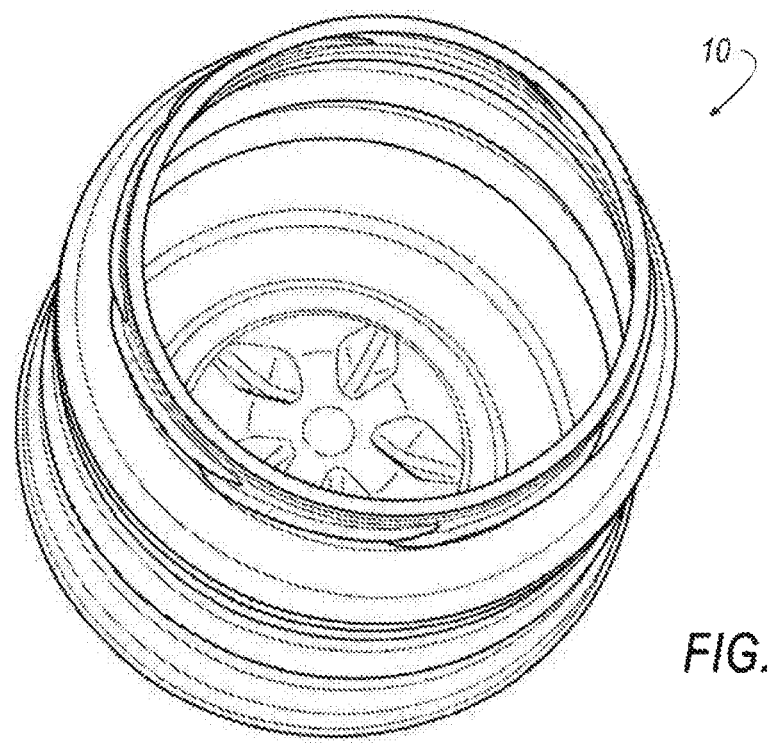
Figure 14:
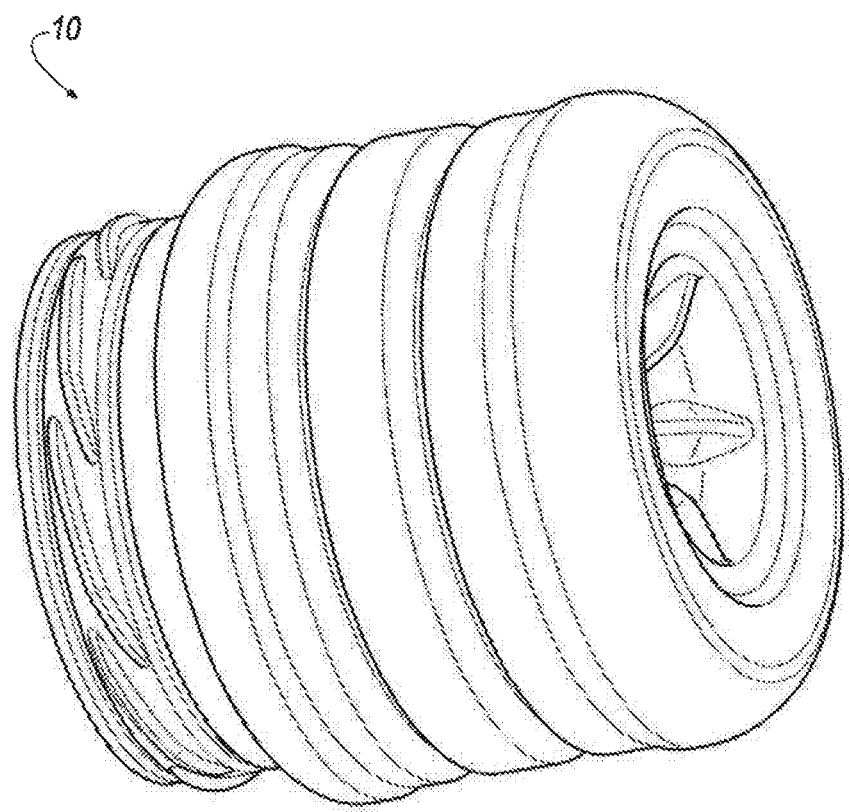

FIG. 7 illustrates a partial cross-sectional view of a neck portion embodying features of the present teachings. FIG. 8 illustrates an enlarged cross-section view of a portion of the neck portion generally depicted in FIG. 7. In the illustrated embodiment, the thread 20 is shown extending (radially) outwardly relative to other portions/segments of the neck portion, and a recess 28 is shown included on the inside (inner radial) wall of the thread. With embodiments, the recess 28 may be generally in the form of a symmetrical curve. As generally illustrated the thread 20, when viewed in cross-section, may include at least three segments—i.e., 30a, 30b, and 30c. Segments 30a and 30c may be generally provided at an angle (viewed in cross section) from the horizontal. In the illustrated embodiment the angle for the segments is about 30 degrees (relative to a base/horizontal plane; i.e., 60 degrees relative to the center line CL of the container). For other embodiments, the angle may be about 30±15 degrees. Segment 30b may include a portion that is substantially closer to a vertical line (e.g., parallel to a center line CL of the container).

Further, the shape of the threads may not necessarily be "symmetrical" (viewed in cross section) for some embodiments. In embodiments, several segments of the thread 20 may include different radiuses associated with curvature. The embodiment of a thread 20 illustrated in FIG. 8 includes and identifies several specific radii—i.e. R1, R2, R3, and R4. For example and without limitation, R1 may be 0.040 in. (1.02 mm), R2 may be 0.035 in (0.90 mm), R3 may be 0.023 in. (0.59 mm), and R4 may be 0.025 in. (0.64 mm). In this embodiment, the relative measurements of R1 and R2 are larger (compared to R3 and R4) and are fairly close to one another (i.e., within 0.005 in.). At the same time, R3 and R4 are comparatively smaller relative measurements (relative to R1 and R2), and are fairly close to each other (i.e., within 0.002 in.). Such radii can provide a thread shape that is desirable for a cap or lid closure application.

FIGS. 9-14 generally illustrate embodiments of a container 10 embodying features of the present teachings, with the container shown from different standard and perspective views.

Figure 15:
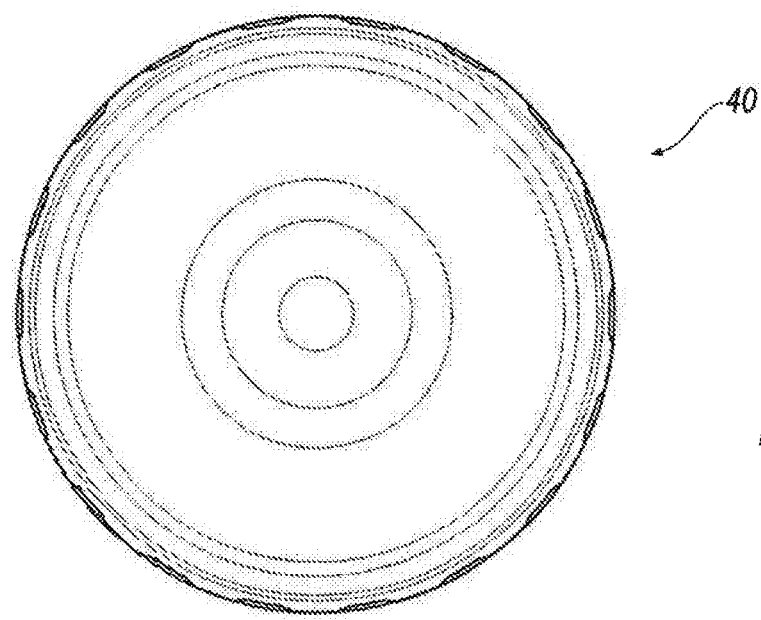
FIGS. 15, 16, and 17 are top plan, bottom plan, and side views of an embodiment of a closure that may be used to engage a neck portion of a container.
Figure 16:
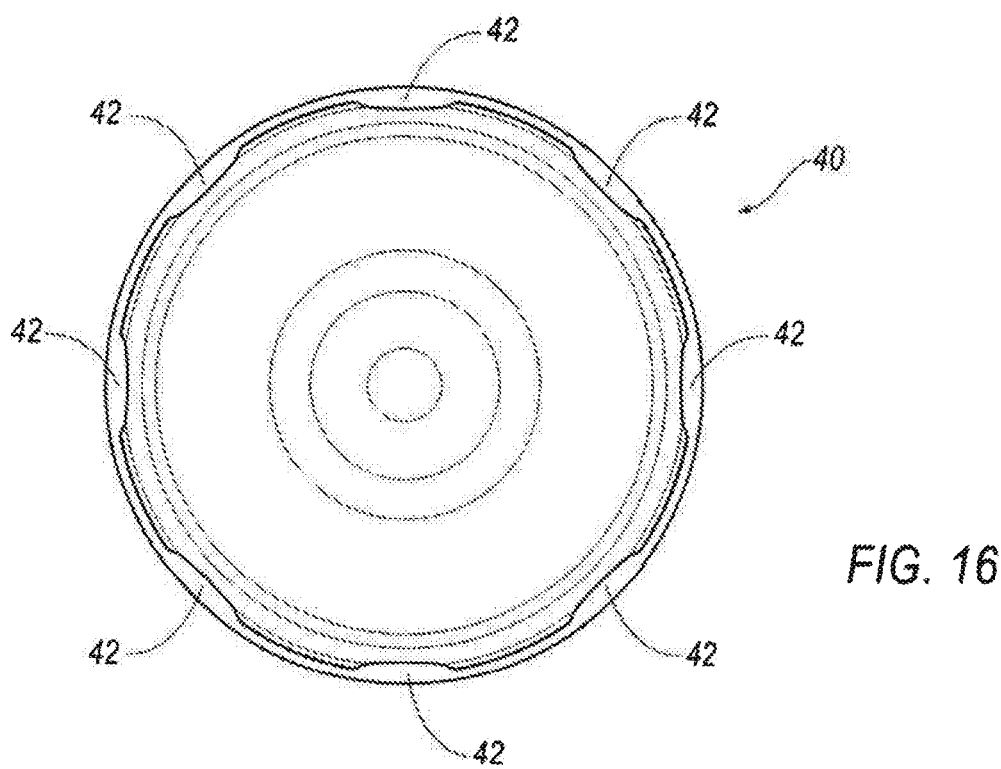
Figure 17:
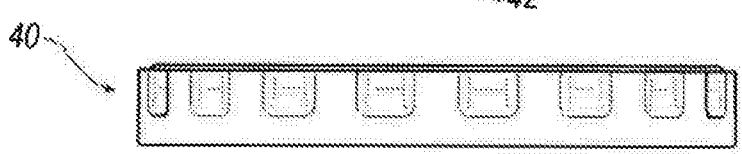
Figure 18:
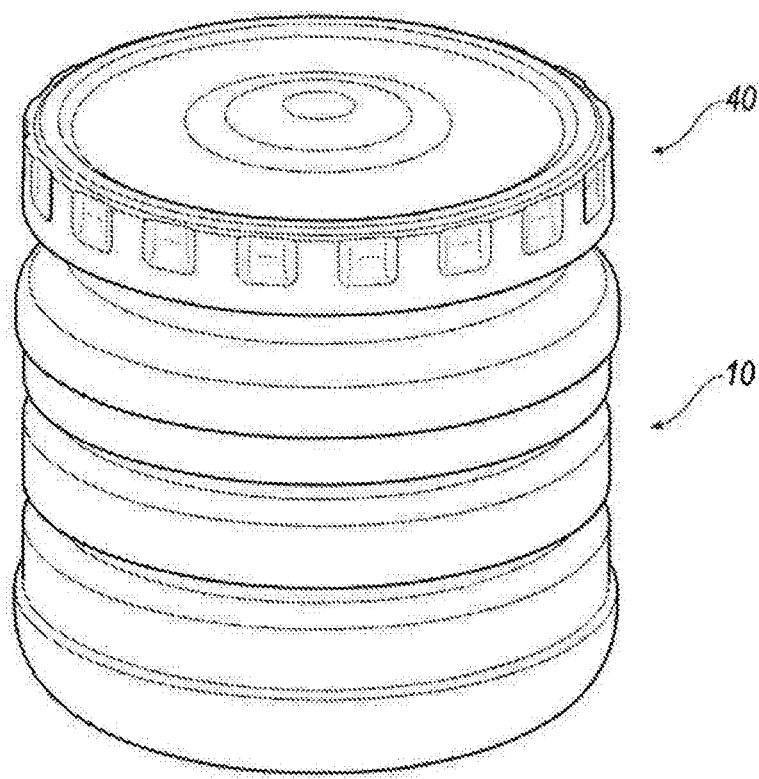
FIG. 18 generally illustrates an embodiment of a closure engaged to a container in accordance with teachings of the present disclosure.

FIGS. 15-17 generally illustrate top plan, bottom plan, and side views of an embodiment of a closure 40 that may be used to engage a neck portion of a container. As generally illustrated in FIG. 16, the closure 40 may include a plurality of bent or radially inwardly extending portions 42 that can be configured to engage threads 20—such as when a closure is screwed (e.g., clockwise) onto the neck portion of a container. While eight bent or radially inwardly extending portions are generally illustrated in FIG. 16, the present disclosure is not limited to that number, and embodiments of closures may have different sizing and/or shapes, and may include more or less such features. FIG. 18 generally illustrates an embodiment of a closure 40 engaged to a container 10 in accordance with teachings of the present disclosure.

Figure 19:
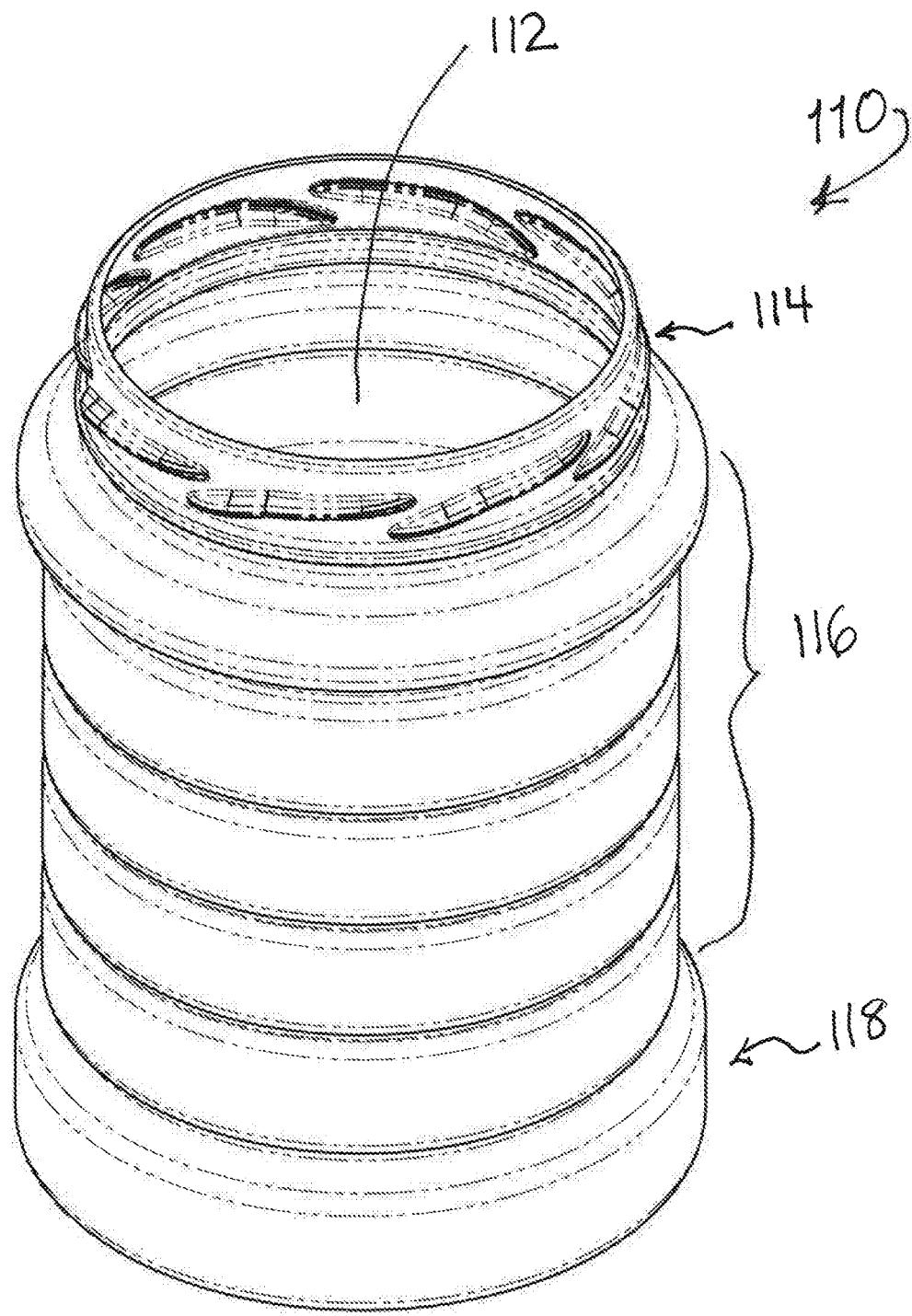
FIG. 19 generally illustrates a perspective view of a three-dimensional model of another embodiment of a container that incorporates features of the present teachings.

With reference to FIG. 19, a three-dimensional model of another embodiment of a container 110 is generally illustrated. The container 110 includes an opening 112, which if desired can be further covered with an optional seal. The opening 112 can serve to fill and/or dispense container contents. The container 110 includes a neck portion 114, a sidewall portion 116, and a base portion 118.

Figure 20:
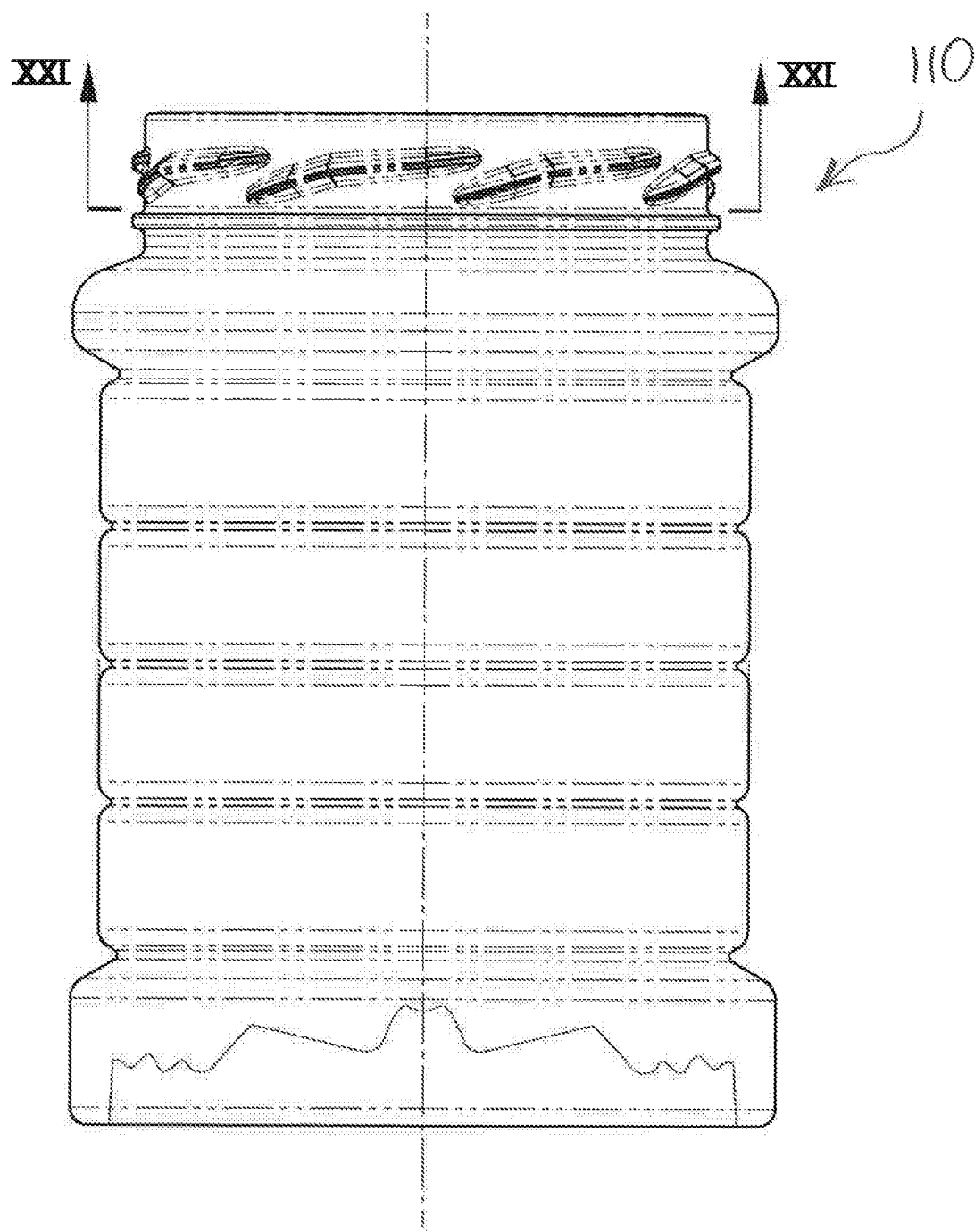
FIG. 20 generally illustrates a side elevational view of an embodiment of a container incorporating features of the present teachings.

FIG. 20 generally illustrates a side elevational view of a container 110 embodying teachings of the present disclosure. The neck portion 114 is shown including a plurality of threads 120, which may also be referred to as "threading formations" or "lugs." In embodiments, the neck portion, and the threads, may be injection molded or, alternatively, may be blown or blow molded. As generally illustrated in FIG. 20, embodiments of the sidewall portion 116 of a container 110 may include one or more horizontal straps 122, grooves, and/or other formations. Such straps 122, grooves, or other formations may provide additional structure and/or support to the sidewall portion 116. With embodiments, the sidewall portion 116 may be configured to help maintain hoop strength. The sidewall portion is generally illustrated as being circular in nature; although, other shapes and/or formations may be associated with or included in the sidewall portion 114.

Figure 21:
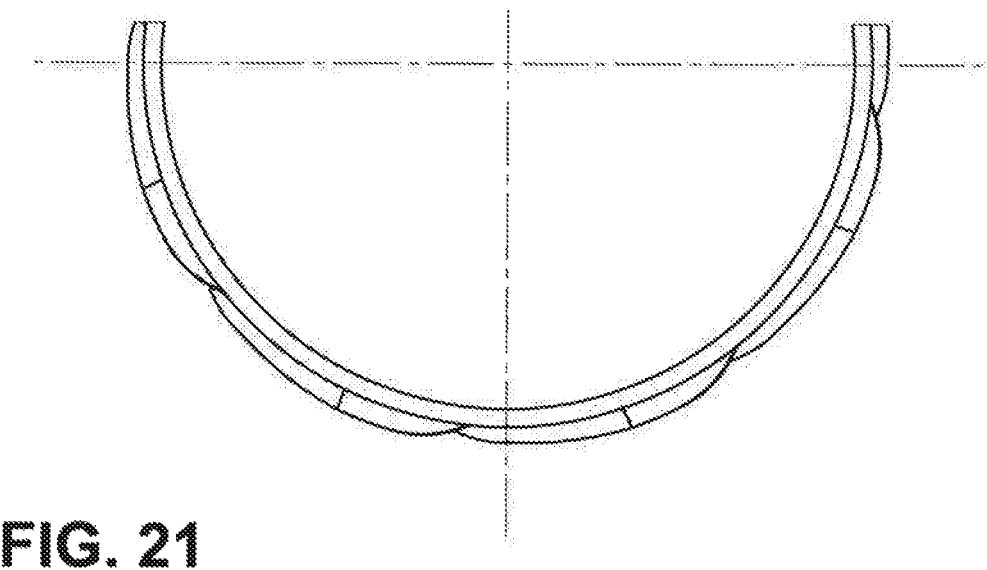
FIG. 21 generally illustrates a partial top plan view of a neck portion of an embodiment of a container incorporating features of the present teachings.
Figure 25A:
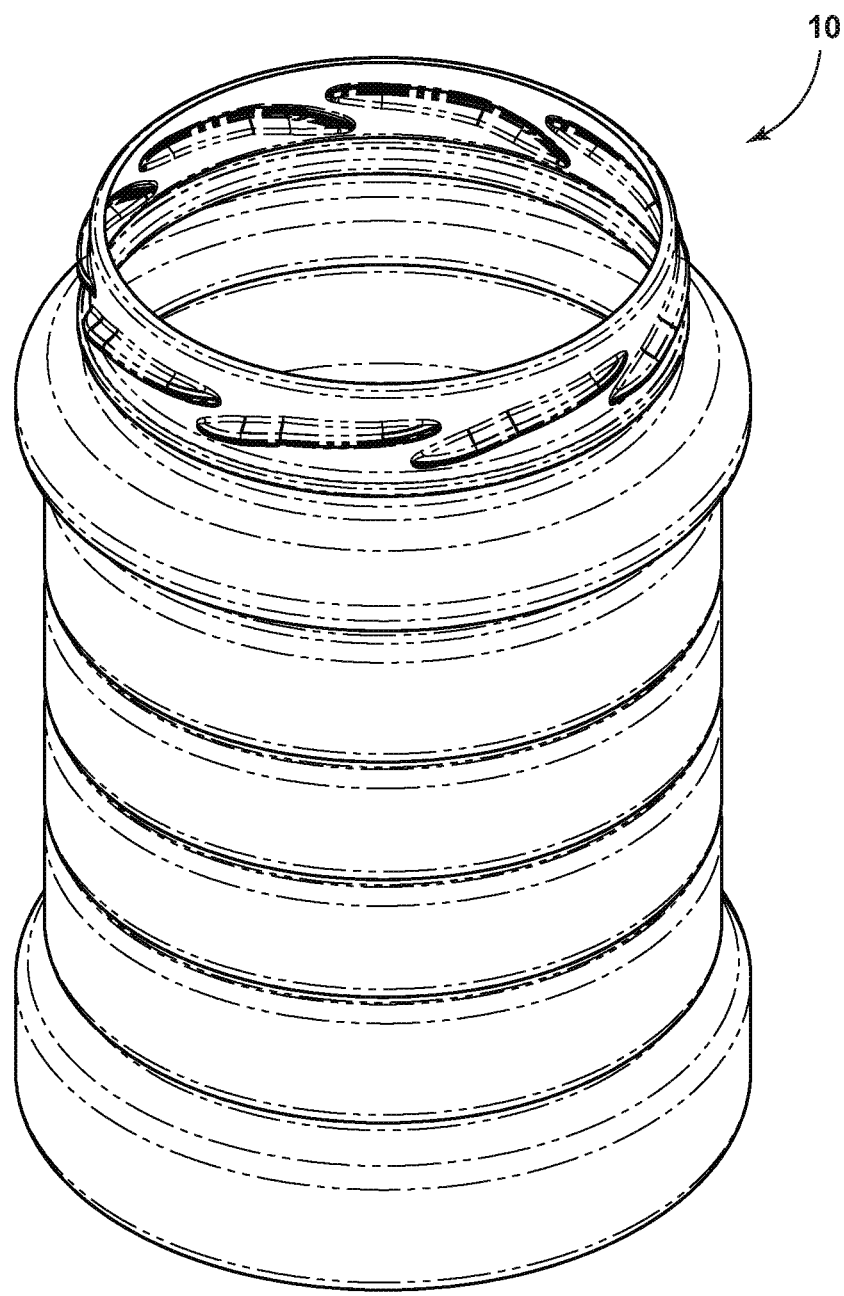
FIG. 25A through FIG. 25F generally illustrate embodiments of a container such as shown in FIGS. 19-24.
Figure 25B:
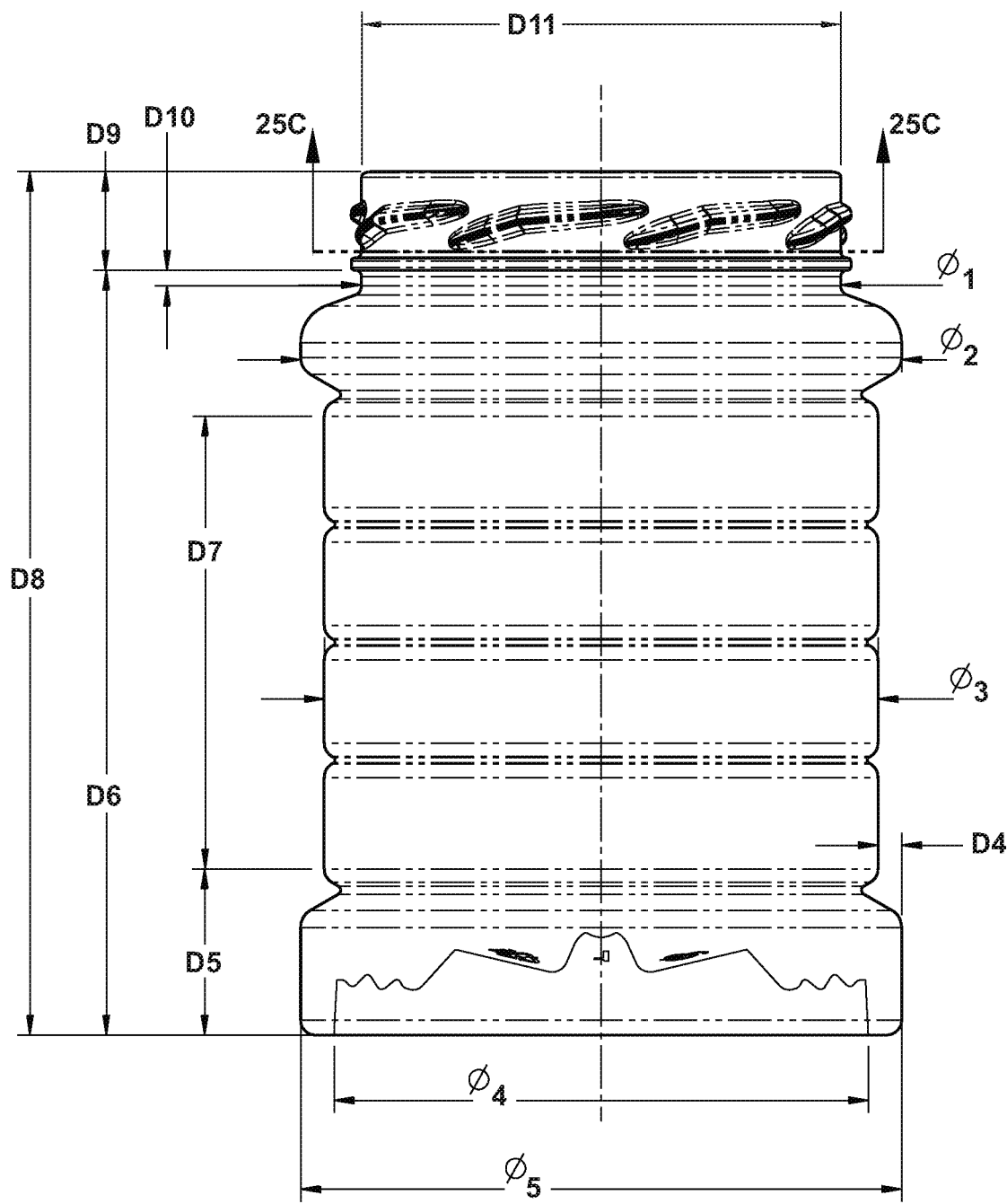
Figure 25C:
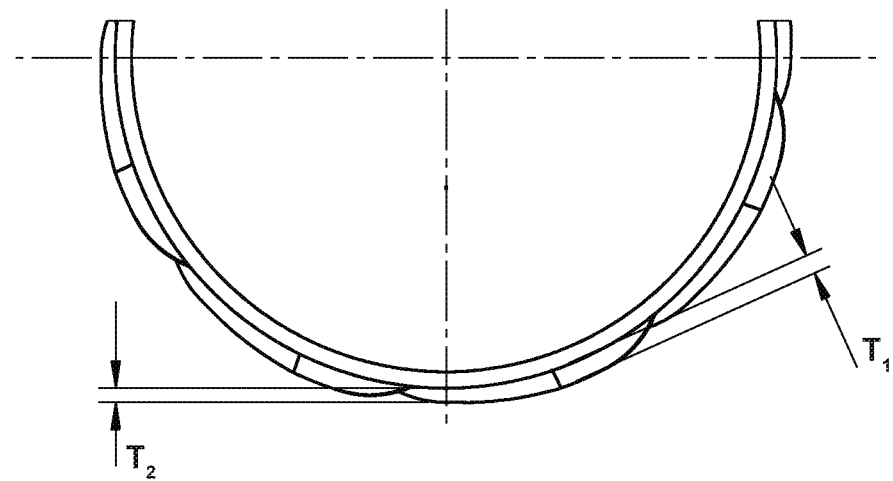
Figure 25D:
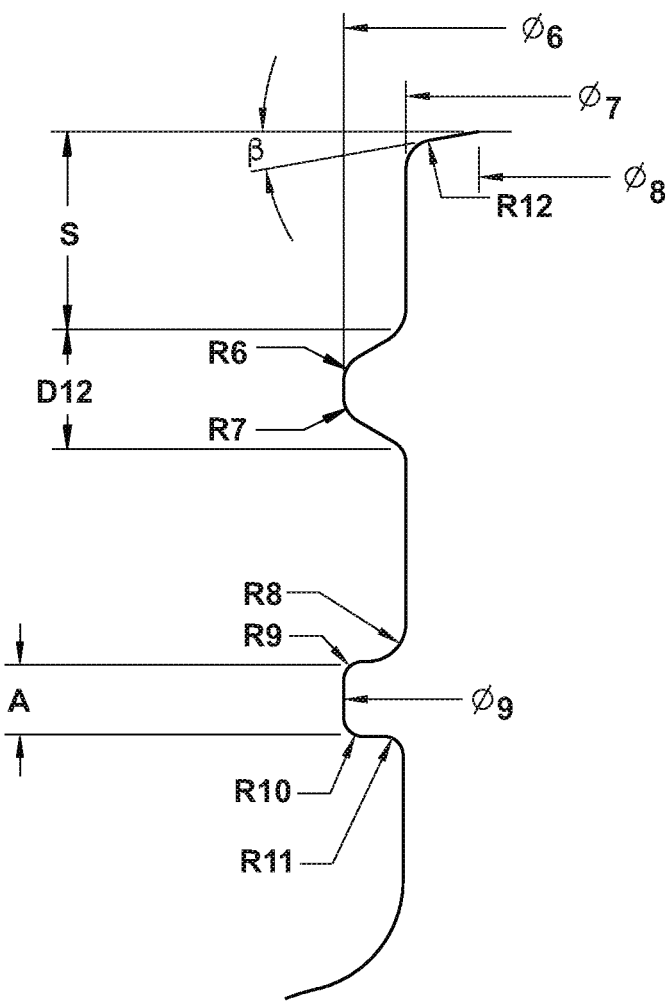
Figure 25E:
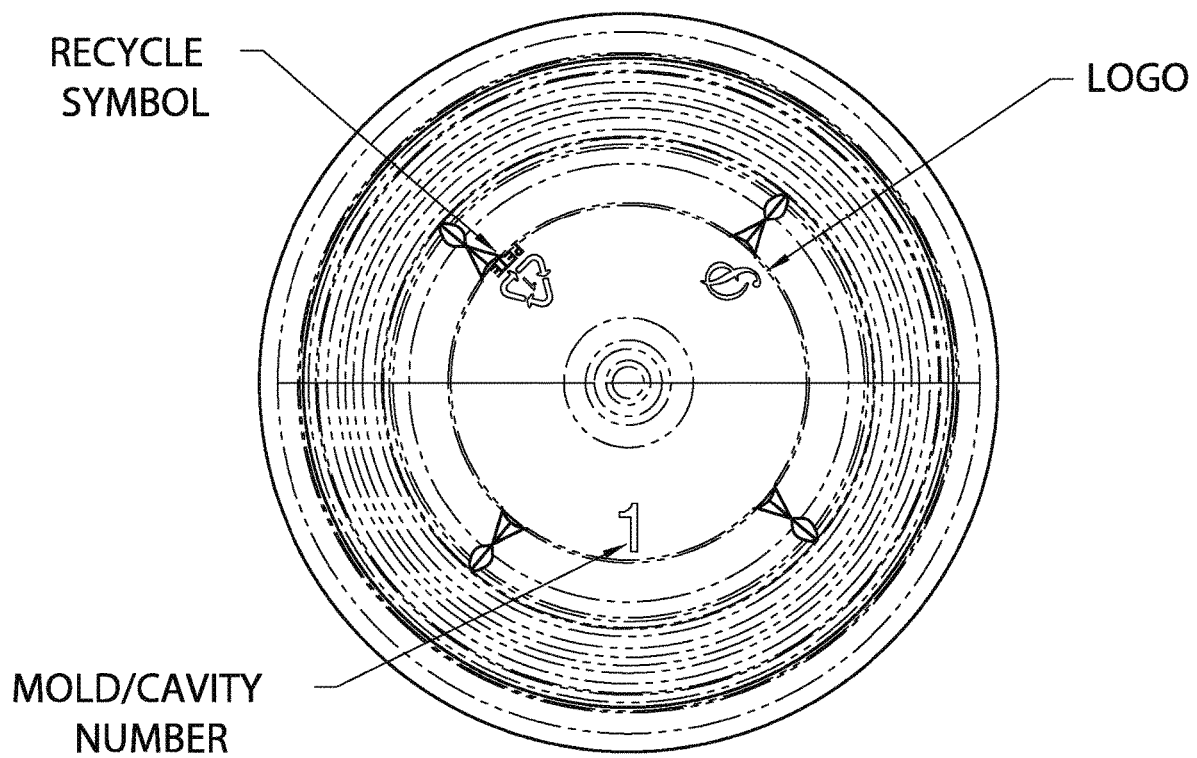

FIG. 21 generally illustrates a partial top plan view of a neck portion of an embodiment of a container incorporating features of the present teachings. In embodiments, the profile (top view) for threads may have a substantially consistent or uniform, radial extent (excluding the beginning and ending portions as those portions terminate back into the outer diameter of the neck, or "E" diameter). An example of such a configuration is generally shown in FIGS. 5 and 6A. However, in other embodiments, such as generally illustrated in FIG. 21, the threads may increase in both height and radial extent around the circumferential extent. For example and without limitation, FIG. 21 and FIG. 25C generally illustrate how the radial extent ("RE"), via a radial thickness of the threads that may increase from T2 (e.g., 0.065 inches) to T1 (e.g., 0.090 inches) moving around the "E" diameter. Such a configuration may, among other things, make it simpler and/or more efficient to blow mold the threads sufficiently or completely out. That can, for example, help eliminate the possibility of stripping the closure past the threads during application of a closure to the container.

Figure 22:
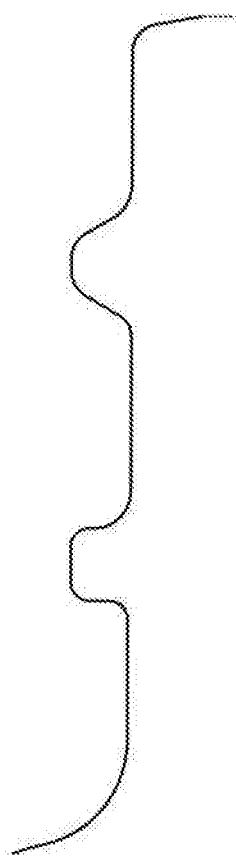
FIG. 22 generally illustrates a partial surface outline of a neck portion of an embodiment of a container incorporating features of the present teachings.
Figure 23:
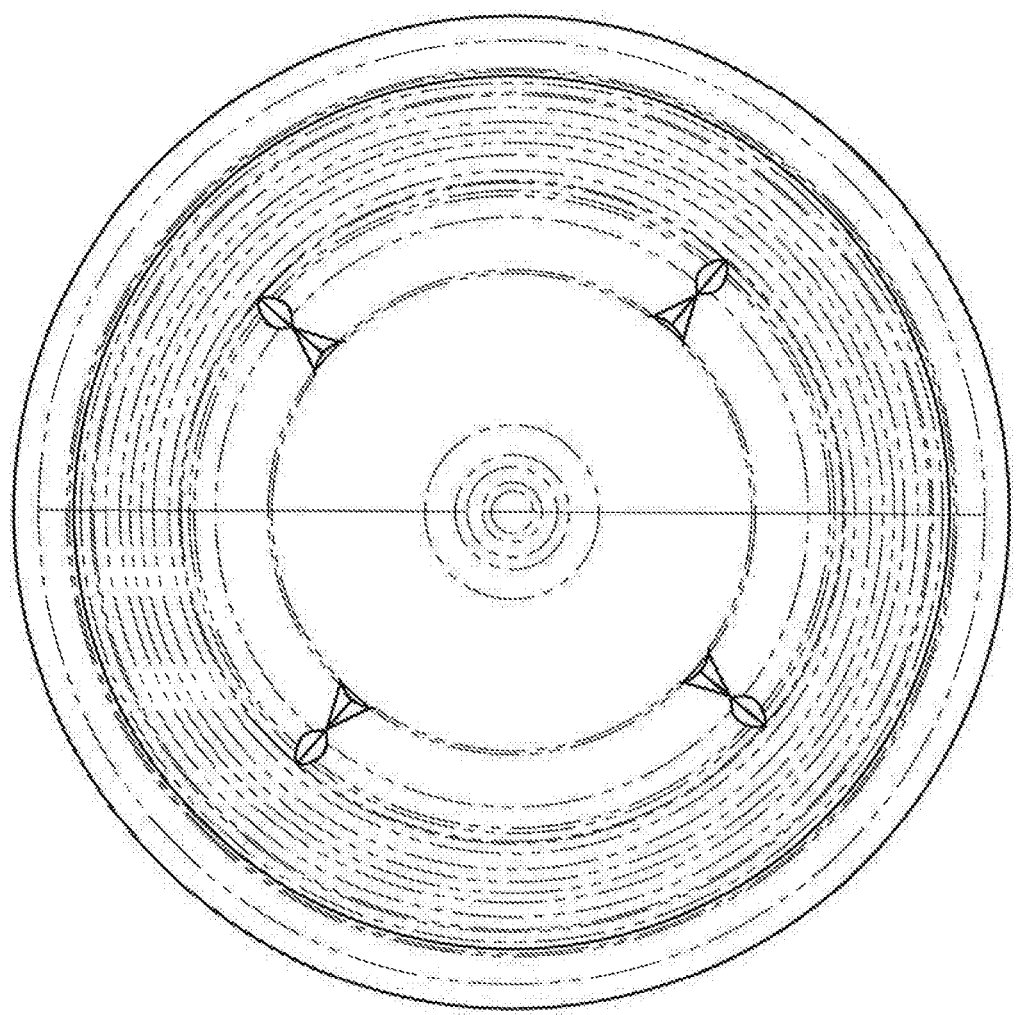
FIG. 23 generally illustrates a bottom plan view of an embodiment of a container incorporating features of the present teachings.

FIG. 22 generally illustrates a partial surface outline of a neck portion of an embodiment of a container, and FIG. 23 generally illustrates a bottom plan view of an embodiment of a container.

Figure 24:
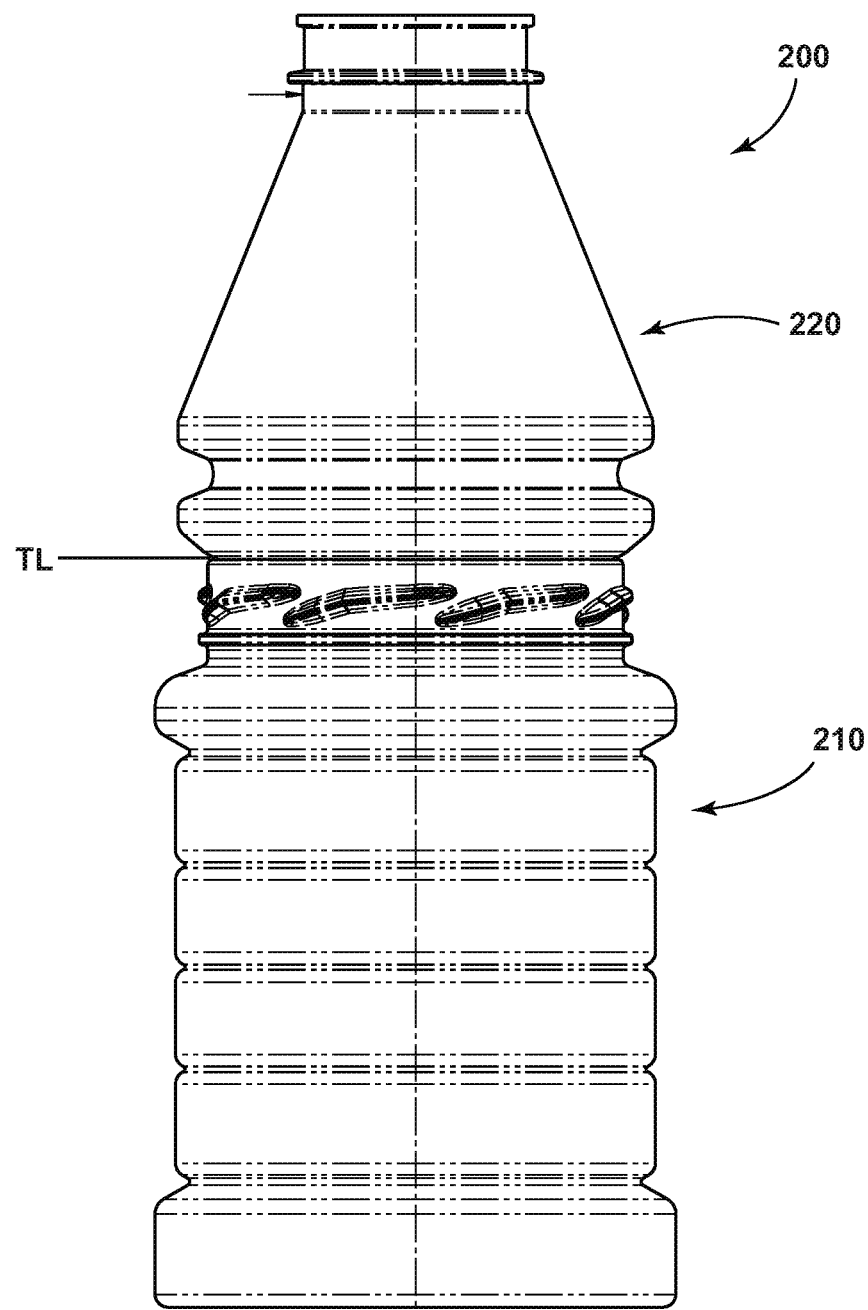
FIG. 24 generally illustrates a side view of an embodiment of a container and trim portion prior to separation of the trim portion.
Figure 25F:
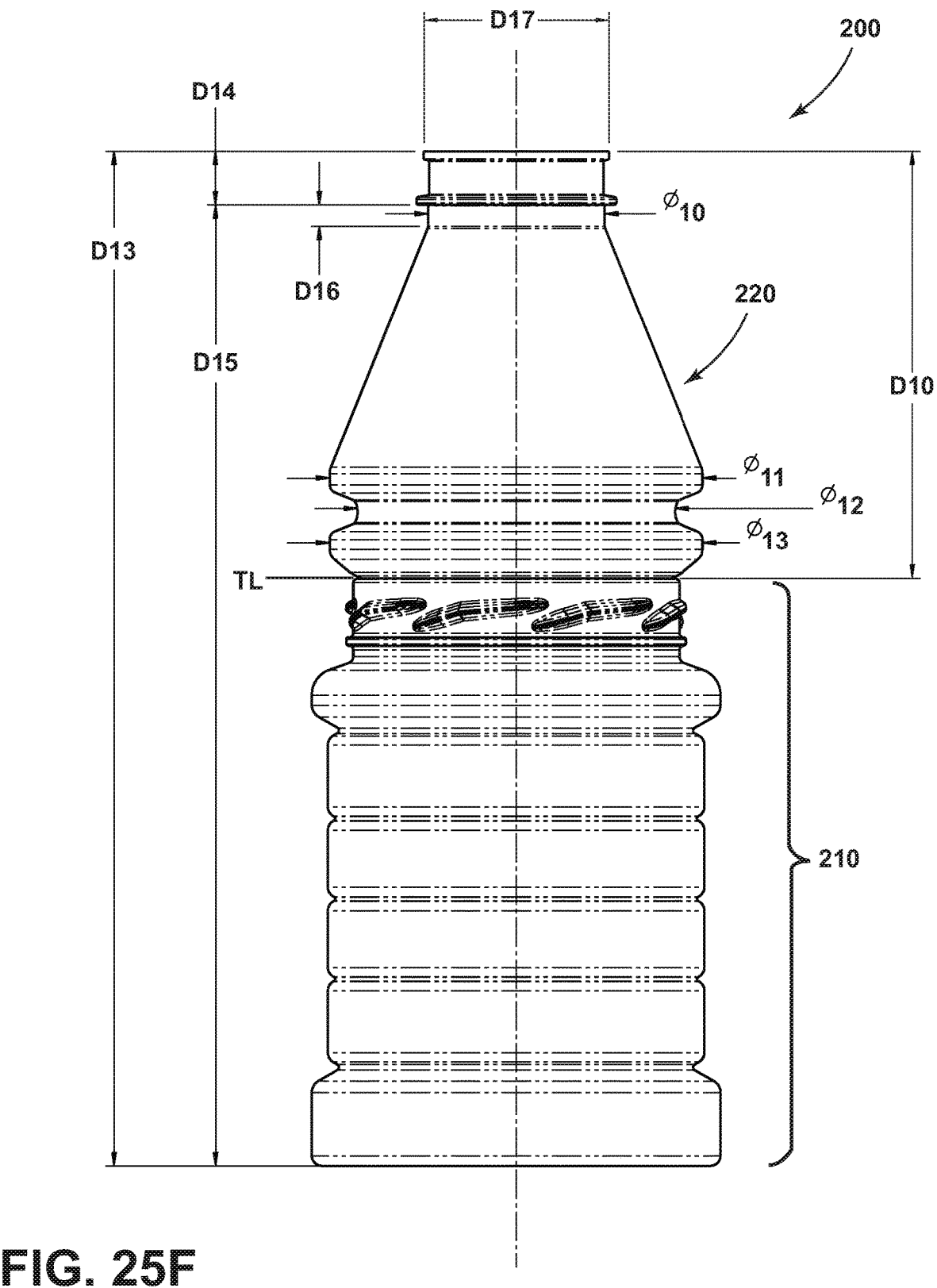

FIG. 24 generally illustrates a side view of an intermediate article 200 comprising a container 210 and trim portion 220. The intermediate article 200 is depicted prior to separation or removal of the trim portion 220 from the container 210. For example and without limitation, in embodiments a preform may be molded (e.g., blow molded) to form an intermediate article 200 that includes a container 210 (or container portion) and a trim portion 220, wherein it is intended that the trim portion 220 is separated or removed from the intermediate article 200, leaving the container 210 having an upper portion with blown threads. In embodiments, a cutting process, which may involve a knife, cutting edge, laser, or other cutting/separation means may be used to perform the separation or removal of the trim portion 220. Such cutting/separation of a trim portion 220 from an intermediate article 200 (to leave a container portion 210) may occur at or about a trim level TL (see, e.g., FIG. 24 or 25F). If desired, one or more additional post-separation/removal processes may optionally be employed to smooth and/or otherwise treat an upper edge and/or upper portion of the container 210 after the separation or removal of the trim portion 220.

FIG. 25A through FIG. 25F generally illustrate an embodiment of a container, similar to the container illustrated in FIGS. 19-24, along with some exemplary dimensions disclosed by way of example and without limitation. More specifically, and without limitations, the following are dimensions that may be associated with an embodiment of the disclosure such as generally illustrated in FIGS. 25B, 25C, 25D, and 25F:

| ELEMENT | DIMENSION |
| --- | --- |
| Ø1[DIA] | 3.050 IN (77.47 mm) |
| Ø2 | 3.825 IN (97.16 mm) |
| Ø3 | 3.525 IN (89.54 mm) |
| Ø4 | 3.401 IN (86.38 mm) |
| Ø5 | 3.825 IN (97.16 mm) |
| Ø6 | 3.180 ± .015 IN |
| Ø7 | 3.050 ± .015 IN |
| Ø8 | 2.899 ± .015 IN |
| Ø9 | 3.180 IN |
| Ø10 | 1.654 IN (42.01 mm) |
| Ø11 | 3.490 IN (88.65 mm) |
| Ø12 | 2.970 IN (75.44 mm) |
| Ø13 | 3.490 IN (88.65 mm) |
| D4 | .150 IN (3.81 mm) |
| D5 | 1.058 IN (26.87 mm) |
| D6 | 4.870 IN (123.70 mm) |
| D7 | 2.885 IN (73.27 mm) |
| D8 | 5.500 IN (139.70 mm) |
| D9 | .630 IN (16.00 mm) |
| D10 | .100 IN (2.54 mm) |
| D11 | 82 mm |
| D12 | .125 IN |
| D13 | 9.500 IN (241.30 mm) |
| D14 | .500 IN (12.70 mm) |
| D15 | 9.000 IN (228.60 mm) |
| D16 | .200 IN (5.08 mm) |
| D17 | 45 mm |
| R6 | .030 IN |
| R7 | .030 IN |
| R8 | .040 IN |
| R9 | .020 IN |
| R10 | .020 IN |
| R11 | .020 IN |
| R12 | .030 IN |
| T1 | .090 IN (2.28 mm) |
| T2 | .065 IN (1.65 mm) |
| X | .630 IN |
| S | .206 IN |
| A | .078 IN |
| β | 10° |

It is noted with the foregoing, that some dimensions may include express ranges, while others may have similar ranges, and both of the foregoing may have manufacturing tolerance variances as one of skill in the art would understand in a proper context of the disclosure.

While not necessarily desirable for all applications, such as where relatively higher heats are associated with contents (e.g., some food contents), some embodiments may employ a base portion that provides a degree of intended flexibility. An example of a base structure with a measure of flexibility that may be employed for some applications is disclosed in U.S. Pat. No. 8,596,029, which is incorporated herein by reference.

A potential benefit of providing containers with neck portions as taught and described in the instant disclosure is that such containers may be able to be run on existing glass container lines, as well as potentially utilizing lids commonly employed with glass containers. Moreover, containers embodying features of the present teachings have been sufficiently strong to maintain vacuum and provide full functionality in connection with tamper-evident metal closures (such as those in which one can listen for a "pop" of "click") to help ensure product safety.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A plastic intermediate article comprising:
   a container portion, including a neck portion having a plurality of threads; and
   a trim portion disposed above the container portion;
   wherein each of the plurality of threads include a first portion and a second portion, the first portion is provided at a first angle relative to a centerline of the plastic intermediate article, the second portion is provided at a second angle relative to the centerline of the plastic intermediate article, the first angle and second angle are different, first portions of each of the plurality of threads vertically overlap and are vertically spaced above a second portion of a successive thread, the plurality of threads extend in succession around the entire circumference of the neck portion, and each thread extends around less than one-quarter of the entire circumference of the neck portion.

2. The plastic intermediate article of claim 1, wherein the plurality of threads are blow molded.

3. The plastic intermediate article of claim 1, wherein the plurality of threads are injection molded.

4. The plastic intermediate article of claim 1, wherein the plastic intermediate article is comprised of polyethylene terephthalate (PET), polyethylene (PE), or polypropylene (PP).

5. The plastic intermediate article of claim 1, wherein the plastic intermediate article is comprised of a blend of two or more polymers.

6. The plastic intermediate article of claim 1, wherein the first angle is greater than the second angle.

7. The plastic intermediate article of claim 1, wherein an outer diameter of the neck portion is at least about five times greater than a vertical distance of the neck portion.

8. The plastic intermediate article of claim 1, wherein each thread of the plurality of threads includes a portion that is overlapped by an adjacent thread and a portion that overlaps another adjacent thread.

9. The plastic intermediate article of claim 1, wherein an uppermost portion of the first portion of the threads is offset from an uppermost portion of the container portion by a vertical distance that is about one-third of a total vertical distance of the neck portion.

10. The plastic intermediate article of claim 1, wherein an uppermost portion of the first portion of the threads is offset from an uppermost portion of the container portion by a vertical distance of about 5.24 mm.

11. The plastic intermediate article of claim 1, wherein the neck portion includes a recess provided with an inside wall of at least one of the plurality of threads.

12. A method for making a plastic container, comprising:
    providing a plastic preform;
    blow molding the plastic preform into an intermediate article that includes a neck portion with a plurality of blown threads, wherein each of the plurality of blown threads include a first portion and a second portion, the first portion is provided at a first angle relative to a centerline of the intermediate article, the second portion is provided at a second angle relative to the centerline of the intermediate article, the first angle and second angle are different, and first portions of each of the plurality of threads vertically overlap and are vertically spaced above a second portion of a successive thread, the plurality of threads extend in succession around the entire circumference of the neck portion, and each thread extends around less than one-quarter of the entire circumference of the neck portion; and
    removing an upper portion of the intermediate article.

13. The method of claim 12, including heat treating the plastic container.

14. The method of claim 12, wherein the removing of the upper portion of the intermediate article includes one or more of the group consisting of a knife, a cutting edge, and a laser.

* * * * *